US012658628B2

(12) United States Patent
Roman, Jr.

(10) Patent No.: US 12,658,628 B2
(45) Date of Patent: Jun. 16, 2026

(54) TERMINAL POSITIONING DEVICE

(71) Applicant: TE Connectivity Solutions GmbH, Schaffhausen (CH)

(72) Inventor: Paul David Roman, Jr., Middletown, PA (US)

(73) Assignee: TE Connectivity Solutions GmbH (CH)

( * ) Notice: Subject to any disclaimer, the term of this patent is extended or adjusted under 35 U.S.C. 154(b) by 360 days.

(21) Appl. No.: 18/332,945

(22) Filed: Jun. 12, 2023

(65) Prior Publication Data

US 2024/0413561 A1 Dec. 12, 2024

(51) Int. Cl.
*H01R 13/41* (2006.01)
*H01R 43/20* (2006.01)

(52) U.S. Cl.
CPC ............ *H01R 13/41* (2013.01); *H01R 43/20* (2013.01)

(58) Field of Classification Search
None
See application file for complete search history.

(56) References Cited

U.S. PATENT DOCUMENTS

| | | | | |
|---|---|---|---|---|
| 4,867,712 A * | 9/1989 | Kato | H01R 13/4362 | |
| | | | 439/744 | |
| 5,085,599 A * | 2/1992 | Maejima | H01R 13/4365 | |
| | | | 439/598 | |
| 6,435,919 B1 * | 8/2002 | Saka | H01R 43/24 | |
| | | | 439/752 | |
| 2017/0352974 A1 * | 12/2017 | Fujimura | H01R 13/6276 | |
| 2017/0365950 A1 * | 12/2017 | Matsuura | H01R 13/64 | |

* cited by examiner

*Primary Examiner* — Oscar C Jimenez

(57) ABSTRACT

An electrical connector includes a terminal holder and a terminal positioning device. The terminal holder defines at least one terminal opening adapted to receive a terminal from a first side thereof in a terminal insertion direction. The terminal positioning device includes a sliding surface abutting a portion of the connector, and at least one terminal contact surface. The terminal positioning device is arranged adjacent the first side of the terminal holder. The device is movable relative to the terminal holder in an operating direction perpendicular to the insertion direction between a first position wherein the terminal positioning device does not overlap the at least one terminal opening in the insertion direction, and a second position wherein the at least one terminal contact surface overlaps the at least one terminal opening in the insertion direction.

19 Claims, 6 Drawing Sheets

TERMINAL POSITIONING DEVICE

FIELD OF THE INVENTION

The present invention relates to connectors, and more particularly, to a terminal positioning device and associated connector.

BACKGROUND

Electrical connector systems often suffer from assembly errors. These errors include, for example, the incorrect or insufficient insertion of terminals of the connector within a corresponding housing. As a result, electrical connectors often implement a terminal position assurance (TPA) device or component, which ensures that partially seated terminals are detected during assembly or mating of the connector system. In this way, an operator may identify and remedy a terminal placement issue during the connector assembly or connector mating processes, avoiding connector damage and/or a failed or unreliable connection.

Given these benefits, the demand for connectors utilizing TPA components has increased. However, their implementation is not without drawbacks. For example, existing TPA devices increase manufacturing and assembly costs, as well as overall connector complexity. Moreover, these components often take up significant space within the connector. Further still, they often do not ensure optimal terminal positioning.

Accordingly, there is a need for improved systems and methods for ensuring the proper installation of terminals in an electrical connector.

SUMMARY

In one embodiment of the present disclosure, an electrical connector includes a terminal holder and a terminal positioning device. The terminal holder defines at least one terminal opening adapted to receive a terminal from a first side thereof in a terminal insertion direction. The terminal positioning device includes a sliding surface abutting a portion of the connector, and at least one terminal contact surface. The terminal positioning device is arranged adjacent the first side of the terminal holder and is movable relative thereto in an operating direction perpendicular to the insertion direction between a first position wherein the terminal positioning device does not overlap the at least one terminal opening in the insertion direction, and a second position wherein the at least one terminal contact surface overlaps the at least one terminal opening in the insertion direction.

BRIEF DESCRIPTION OF THE DRAWINGS

The invention will now be described by way of example with reference to the accompanying Figures, of which.

DETAILED DESCRIPTION OF THE EMBODIMENTS

Figure 1:
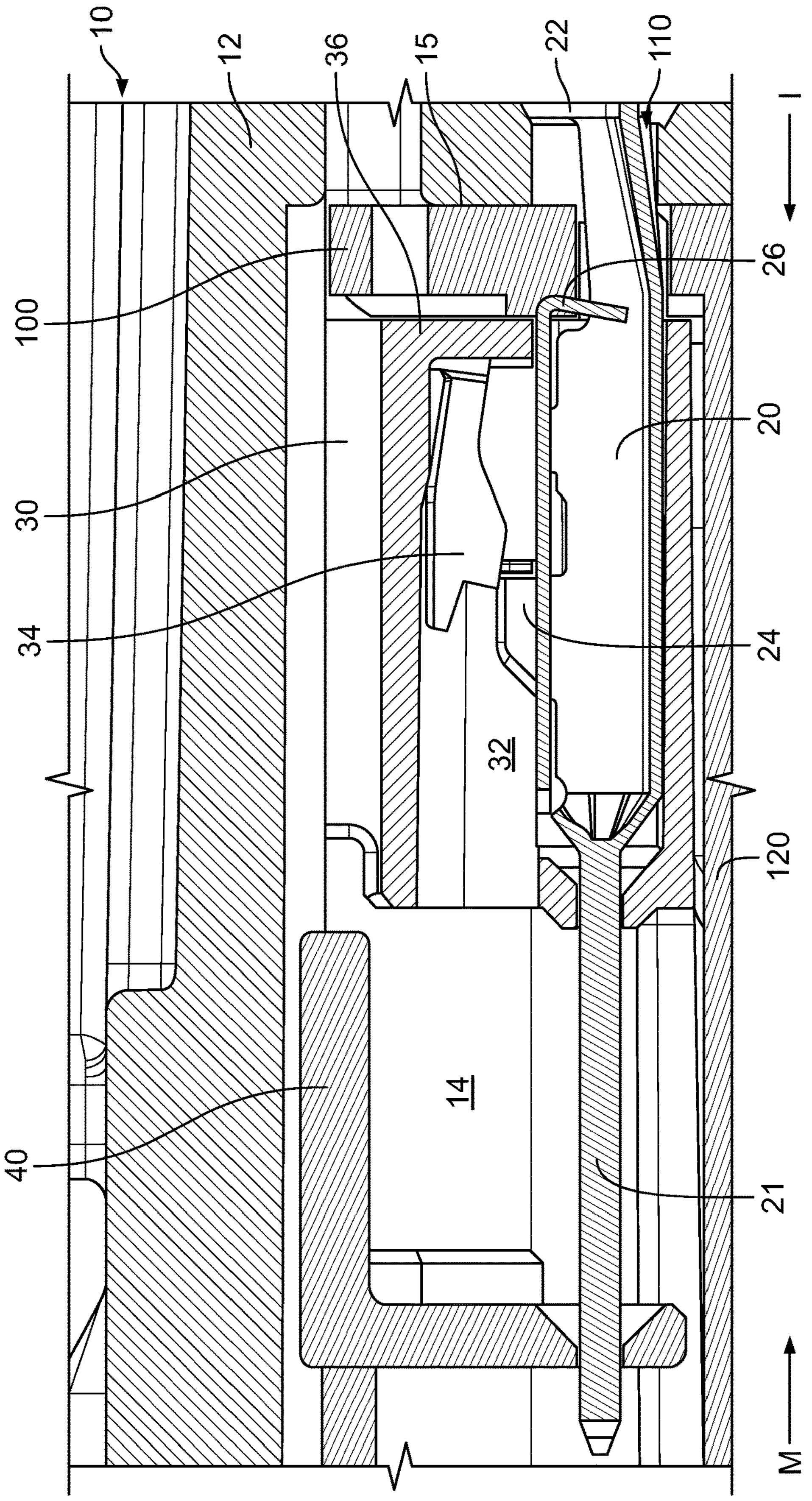
FIG. 1 is partial side sectional view of an electrical terminal including a terminal positioning device in an open position and a terminal in a partially inserted position according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include a terminal positioning device adapted to position and lock terminals within electrical connectors. In one embodiment, an electrical connector is provided which includes a terminal holder defining at least one terminal opening, at least one terminal installed into the at least one of opening from a first side of the terminal holder in an insertion direction, and a terminal positioning device arranged adjacent the first side of the terminal holder. The terminal positioning device is movable relative to the terminal holder in an operational direction perpendicular to the insertion direction of the terminal. The terminal positioning device includes a body having a terminal locking protrusion extending from the body in a direction toward the terminal. The terminal locking protrusion defines an inclined section extending obliquely relative to the operational direction of the device. The device is movable between a first initial position wherein the terminal locking protrusion is offset from the terminal in the operational direction, and a second position wherein the terminal locking protrusion is at least partially aligned with the terminal in the operation direction.

Figure 2:
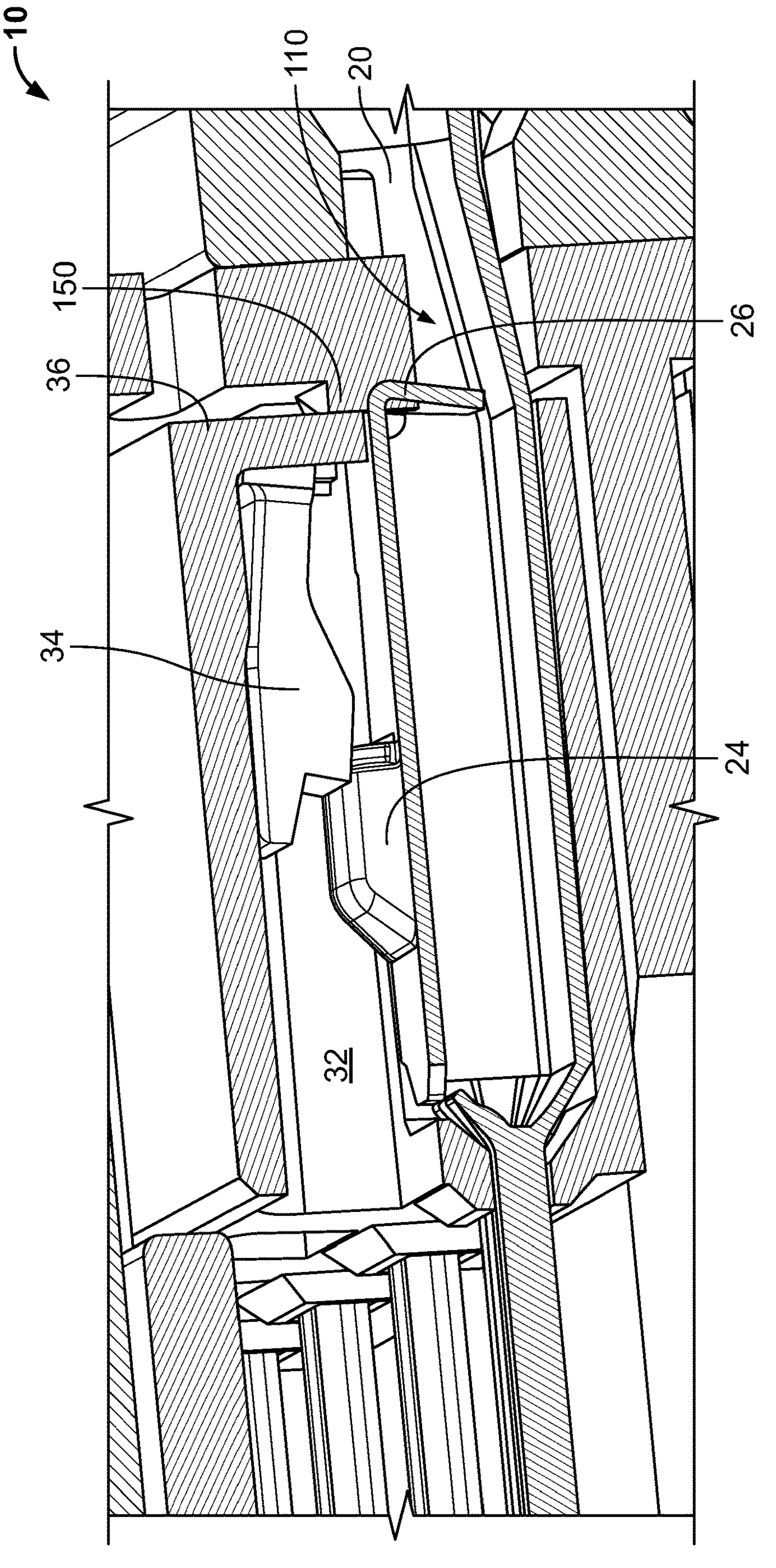
FIG. 2 is another side sectional view of the connector of FIG. 1 with the terminal positioning device in a closed position and a terminal in a partially inserted position.
Figure 3:
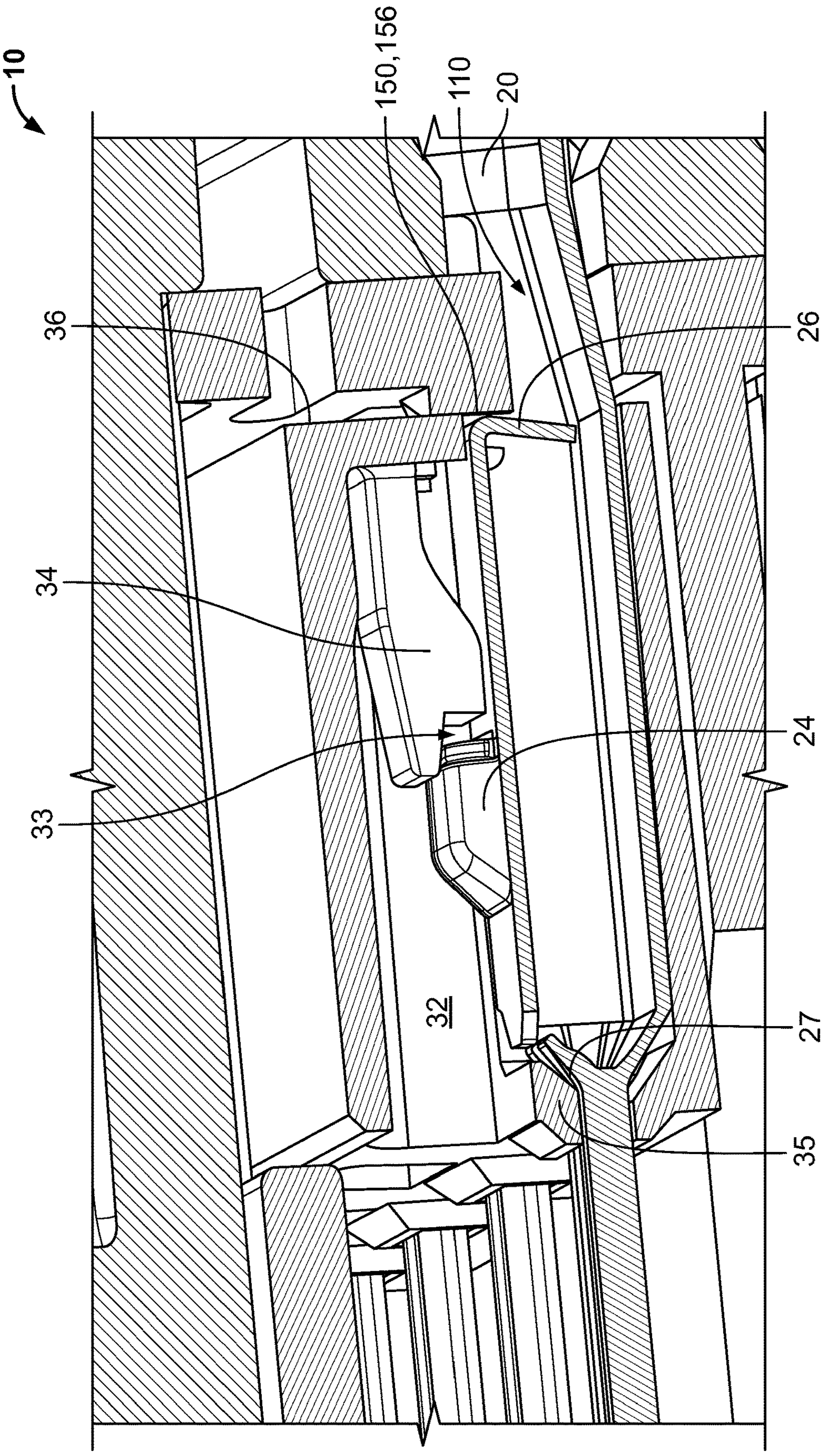
FIG. 3 is another side sectional view of the connector of FIG. 2 with the terminal in a fully inserted or installed position.

Referring generally to FIGS. 1-3, embodiments of the present disclosure will be described as implemented into an exemplary electrical connector 10. The representative connector 10 includes a body 12 (e.g., a molded polymer body) defining a receiving cavity or opening 14 into which, for example, a mating connector may be inserted in a mating direction M. The body 12 houses one or more conductive terminals 20, a terminal holder 30, an optional pin protection device 40, and a terminal positioning device 100 according to an embodiment of the present disclosure. In the exemplary connector 10, the terminals 20 are rear-loaded, or installed into a rear of the terminal holder 30 in an insertion direction I.

Figure 7:
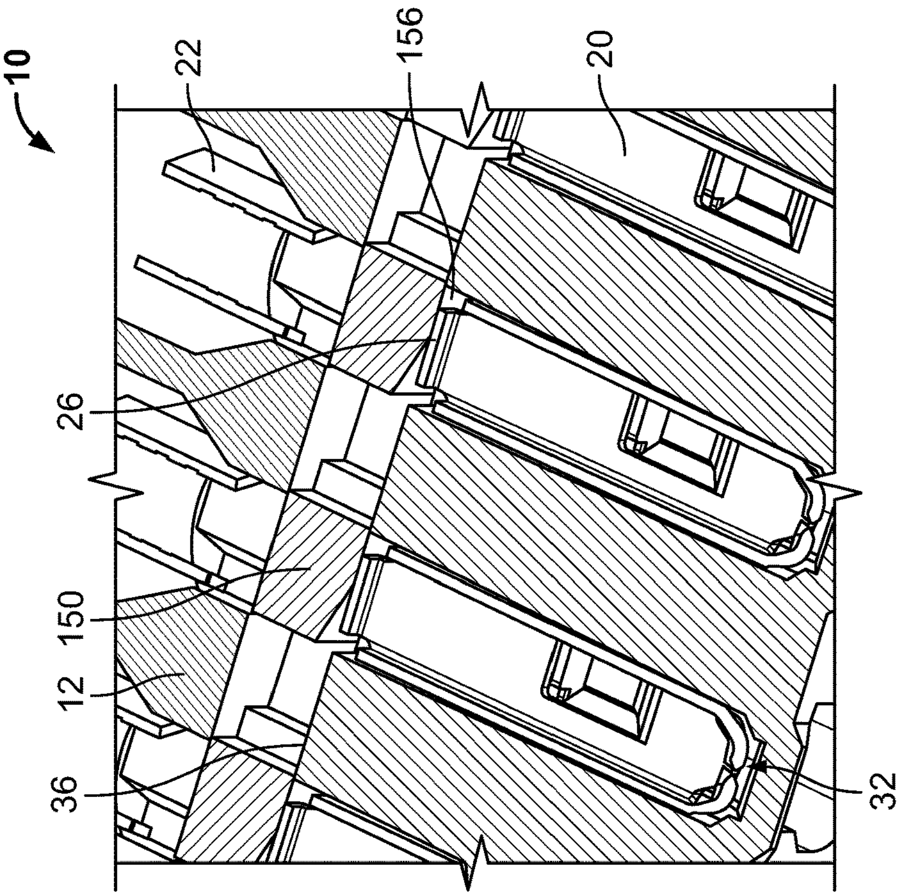
FIG. 7 is a sectional view of the electrical connector of FIG. 6 with the terminal positioning device in the closed position.
Figure 6:
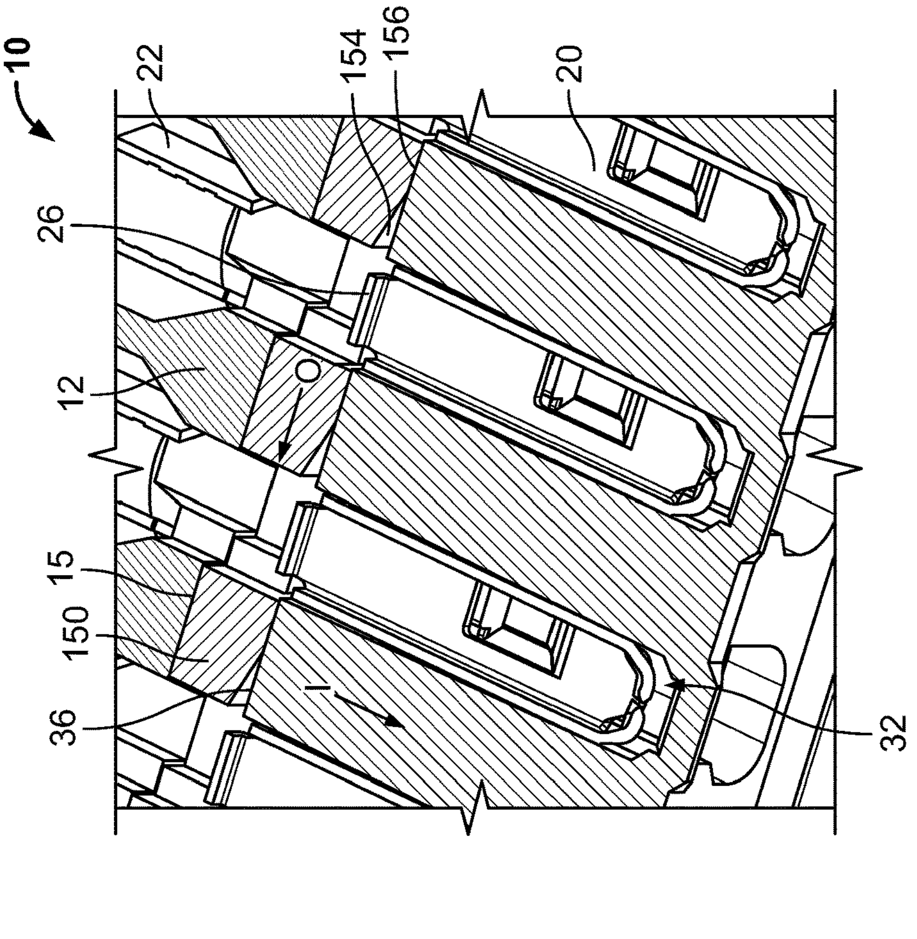
FIG. 6 is a sectional view of the electrical connector of FIGS. 1-3 with the terminal positioning device in the open position.

Each terminal 20 includes a mating end 21 (e.g., a pin) and a connecting end 22 (e.g., a crimping section, as shown in FIGS. 6 and 7). Each terminal 20 further defines a locking element or feature 24. The locking element 24 of the exemplary terminal 20 extends from a top thereof, and is sized and positioned to engage with a corresponding locking feature of the connector 10. More specifically, the terminal holder 30 is fixedly arranged within the cavity 14 of the connector 10, and includes a plurality of openings 32 each sized to accommodate one of the terminals 20. The terminal holder 30 defines primary terminal locks 34, such as a cantilevered locking arms extending into each opening 32. Each terminal lock 34 is operative to engage with the locking element 24 of each terminal 20 after the terminal has been inserted to a sufficient predetermined depth within the terminal holder 30. Once engaged, the terminal lock 34 prevents the terminal 20 from being removed from the terminal opening 32 in a direction opposite the insertion direction I.

Referring to FIGS. 1 and 2, the terminal 20 is only partially installed or inserted within the terminal holder 30. Resultingly, the terminal lock 34 has not engaged with the locking element 24 of the terminal 20. In this position, the terminal 20 is at risk of being further displaced rearward (e.g., during mating), and possibly dislodged completely from the terminal holder 30. Moreover, the partially installed terminal 20 shown in FIGS. 1 and 2 will not provide the same wipe or conductive contact area with a mating connector.

As shown in FIG. 3, however, after the terminal 20 has been inserted into the opening 32 to a sufficient depth to pass the terminal lock 34, the lock elastically biases vertically downward, and opposes the locking element 24 of the terminal in a direction opposite the insertion direction I. In this condition, while the terminal 20 is prevented from being dislodged from the terminal holder 30, it is not necessarily maintained in this optimized position (i.e., at its forward-most position). Specifically, as can be seen in FIG. 3, a gap 33 between the terminal lock 34 and the locking element 24 exists. As a result, the terminal 20 may be displaced rearward (e.g., during mating) until such gap is eliminated while remaining locked in the terminal holder 30. The terminal positioning device 100 according to embodiments of the present disclosure is operative to prevent the partial terminal insertion condition shown in FIGS. 1 and 2, position each terminal optimally within its terminal holder, and maintain such a position during use, as shown in FIG. 3.

Figure 4:
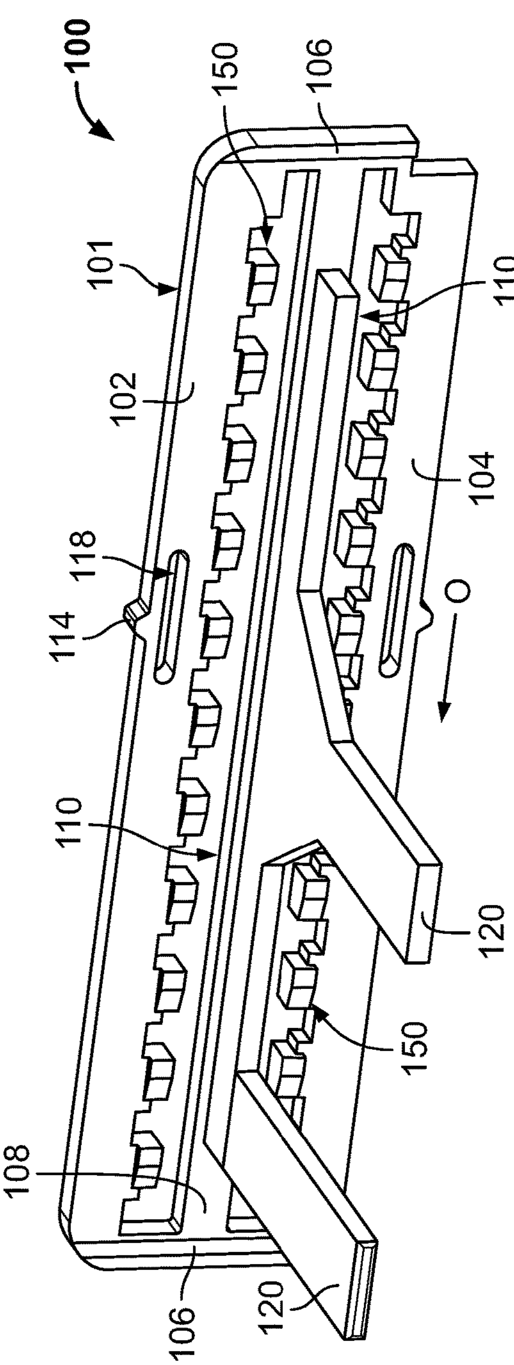
FIG. 4 is a front perspective view of a terminal positioning device according to an embodiment of the present disclosure.
Figure 5:
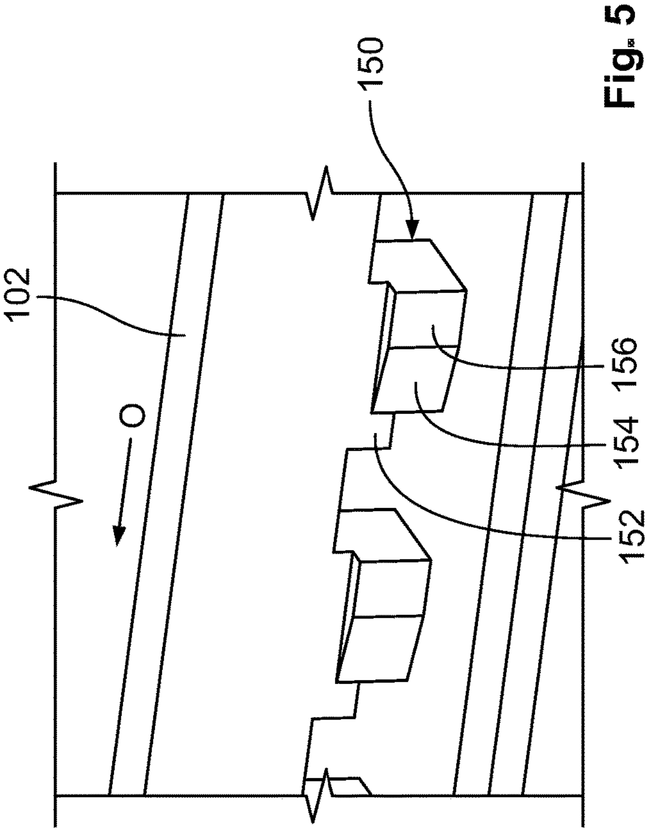
FIG. 5 is a detailed view of a portion of the terminal positioning device of FIG. 4.

An exemplary configuration of the terminal positioning device 100 is shown in FIGS. 4 and 5. The terminal positioning device 100 includes a frame having a generally horizontal top wall 102, a generally horizontal bottom wall 104, and two vertical sidewalls 106. In some embodiments, an intermediate support 108 is provided and spans between the sidewalls 106 at a non-zero distance from the top and bottom walls 102,104 in the vertical direction. As a result, two slots or openings 110 are defined on either side of the intermediate support 108. The openings 110 are adapted (i.e., sized and located) to accommodate portions of the terminals 20 therethrough which extend rearward from the insertion side or rear of the terminal holder 30, as shown in FIGS. 1-3 for example.

The terminal positioning device 100 further includes at least one terminal locking protrusion or terminal lock 150. In the exemplary embodiment, the device 100 defines two rows of terminal locks 150, with each lock spaced evenly along the row. The spacing of the terminal locks 150 corresponds to a spacing of each terminal 20 of the connector 10. In the exemplary embodiment, each terminal lock 150 includes a tooth-like projection or protrusion 152 extending from a respective one of the top and bottom walls 102,104, and a terminal contact surface including a ramped or inclined surface or section 154 and a planar bearing or locking surface or section 156. See, for example, FIG. 5, wherein the projections 152 of the terminal locks 150 extend vertically downward from the top wall 102. From the projection 152, the ramped surface or inclined section 154 extends in a direction away from the top wall 102. Specifically, the ramped surface 154 extends obliquely relative to a sliding or bearing surface of the device 100 (e.g., a rear surface 101 of the device 100 and/or the planar surface 154). The direction of inclination is opposite to a direction of operation O of the device 100. The planar bearing section 156 of the contact surface is formed directly adjacent to the ramped section 154. The planar bearing section 156 may be generally parallel to a front surface 101' and/or the rear surface 101 of the device 100, and/or to a rear surface 36 of the terminal holder 30 and acts as a bearing surface against the terminal holder 30 as the device 100 is moved in the operational direction O. See FIGS. 6 and 7. Further, the planar surfaces or sections 156 act as mechanical stops in the closed position of the device 100, preventing terminal motion in a direction opposite the insertion direction I. See FIGS. 3, 7 and 9.

Referring again to FIGS. 4 and 5, the device 100 comprises a pair of detents or latching protrusions 114. In the exemplary embodiment, one detent 114 is formed on each of the top and bottom walls 102,104. Void spaces or openings 118 are formed directly under (or above) each detent 114, creating a spring-like beam on which the detent 114 is formed. In this way, an elasticity of each detent 114 in a direction of the openings 118 is created when subject to, for example, compressive forces. As set forth in greater detail with respect to FIGS. 8 and 9, the detents 114 are used to control the position of the device 100 in use. The terminal positioning device 100 further includes at least one, and in the illustrated embodiment two, actuator(s) 120 extending in a forward direction from the front surface 101' thereof. As can be seen in FIG. 1, the actuator(s) 120 extend through the cavity 14 of the connector 10 and provide a means for a user to mechanically bias the device 100 in the operating direction O (or an opposite direction).

The function of the terminal positioning device 100 will now be described in reference to the figures. FIG. 2 provides an illustration of the terminal 20 in a partially inserted or installed position, and the device 100 in a locked or closed position, demonstrating the interference existing between the terminal locks 150 and a rear surface 26 of the terminal 20. FIG. 3 illustrates the terminal 20 in a fully inserted position. As shown, the planar surface 156 of the terminal lock 150 is abutting the rear surface 26 of the terminal 20. A front portion of the terminal 27 is abutted against an opposing end surface 35 of the terminal holder 30. In this way, the terminal 20 is at its forward most or ideal position. As a result, terminal wipe is maximized, and movement (e.g., resulting from vibration, etc.) is minimized by the constant insertion force applied by the device 100.

The device 100 is shown in a first or open position in FIG. 6. In this position, the terminals 20 are free to be inserted or installed into the terminal holder 30 at least partially through gaps formed between adjacent terminal locks 150 during assembly of the connector 10. As shown, each terminal 20 is only partially installed or inserted into its respective opening 32. From the open position shown in FIG. 6, the terminal positioning device 100 is slidable in the indicated operating direction O. Specifically, the device 100 is slidably held between a rear surface 36 of the terminal holder 30 and an opposing internal wall or surface 15 of the connector body 12. Leading with the inclined surface 154, each terminal lock 150 engages with the rear end surface 26 of each terminal 20 as the device 100 is biased in the direction O. As the device 100 is further biased in the direction O, the terminals 20 are urged in the insertion direction I via the inclined surface 154. FIG. 7 shows a second or closed position of the device 100, wherein the rear surfaces 26 of each terminal 20 have reached abutment with the planar surface 156 of each terminal lock 150. The terminals 20 have reached, or nearly reached, their final fully seated position, and remain held there by the continued engagement with the device 100.

Figure 8:
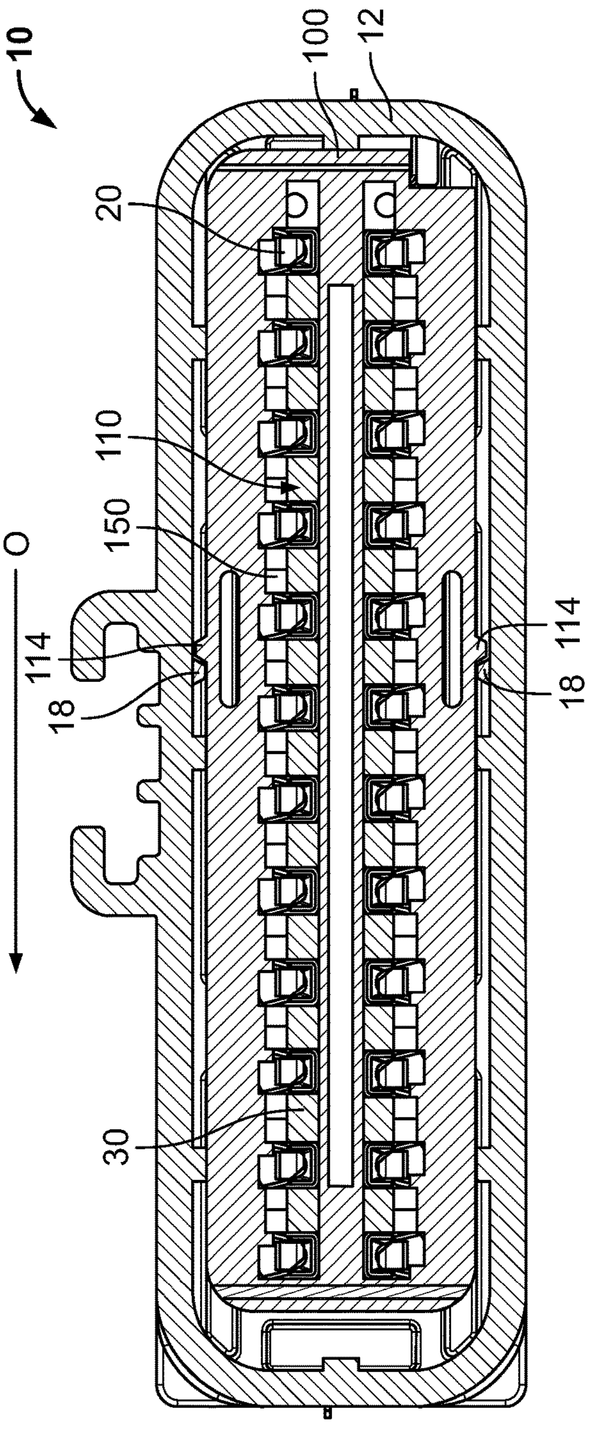
FIG. 8 is a rear sectional view of the electrical connector of FIGS. 1-3 with the terminal positioning device in the open position.
Figure 9:
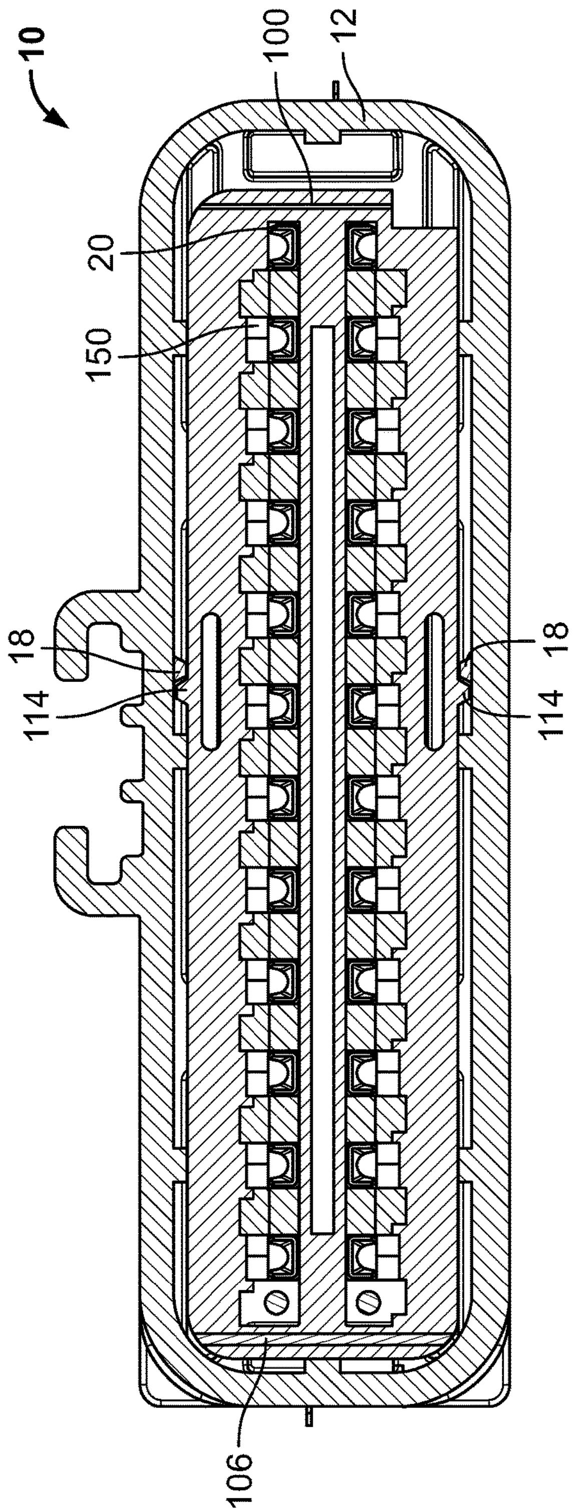
FIG. 9 is a rear sectional view of the electrical connector of FIG. 8 with the terminal positioning device in the closed position.

FIG. 8 is a rear section view of the device 100 in the first or open position. The ends of the terminals 20 extend through the openings 110 of the device 100, unobstructed by the terminal locks 150 which are offset from the terminals in the operating direction O (or a direction opposite thereto). The detents 114 of the device 100 are abutted against similar protruding elements 18 of the connector body 12, thus providing a positive stop for identifying the open position to a user. This may also be considered a loading position of the device 100, wherein the terminals 20 are free to be installed into the connector body 12/terminal holder 30 without interference. By biasing the device 100 in the operating direction O, the detents 114 are compressed and pass each corresponding protruding element 18 as the device moves into the closed position shown in FIG. 9. During this action, any terminal 20 not fully seated will be urged into, or nearer to, a fully seated position as described above. The resistance provided by the engagement of the detents 114 and the elements 18 provides a mechanical feel to a user, and more specifically an indication that the device 100 has been moved from the open position to the closed position, and thus that no further force applied on the device is required. Of course, additional detents or mechanical stops may also be provided to limit the travel of the device 100 so as to prevent a user from biasing it past the closed position. For example, as shown in FIG. 9, the sidewall 106 of the device 100 is abutted against an opposing interior wall of the connector body 12. The device 100 may be left in this second, locked or closed position, thereby ensuring the position of terminals 20 remains optimized, and improving connector performance, particularly in high vibration or shock applications.

While embodiments of the present disclosure have been described in the context of an exemplary electrical connector 10, including a terminal holder 30, embodiments may be used with connectors having other forms and/or features, including those without a separate terminal holder, without departing from the scope of the present disclosure.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A terminal positioning device for an electrical connector, comprising:

a sliding surface adapted to slide against a component of an electrical connector in an operating direction;

a terminal contact surface including at least one ramp surface oriented obliquely relative to the sliding surface and adapted to selectively engage with an electrical terminal of the electrical connector and a planar section adjacent the ramp surface, the planar section defining a contact surface that is parallel with the sliding surface, the ramp surface engages the electrical terminal before the contact surface as the terminal positioning device moves along the operating direction; and an opening sized and located to accommodate a portion of the electrical terminal therethrough.

2. The device of claim 1, further comprising a plurality of terminal locks extending from the device in a direction generally normal to the operating direction, the terminal locks each defining the terminal contact surface including the ramp surface.

3. The device of claim 2, wherein the plurality of terminal locks are arranged in a row extending in the operating direction.

4. The device of claim 3 wherein the plurality of terminal locks are arranged in a plurality of rows, each row extending in the operating direction and spaced from an adjacent row in a direction normal to the operating direction.

5. The device of claim 3, further comprising a top wall, a bottom wall and at least one wall joining the top wall to the bottom wall.

6. The device of claim 5, wherein the row of terminal locks extends from the top wall or the bottom wall.

7. The device of claim 1, further comprising an actuator extending in a direction normal to the operating direction.

8. The device of claim 1, further comprising a mechanical stop defined on an exterior surface of the device and adapted to interface with the electrical connector for limiting the range of motion of the device in the operating direction.

9. The terminal positioning device of claim 1, further comprising a detent formed on a top wall or a bottom wall of the device.

10. The terminal positioning device of claim 9, wherein a void space extends through the top wall or the bottom wall of the device and forms a beam directly under or directly above the void space, the detent is formed on the beam, the beam creates an elasticity in the detent when the detent is subjected to a compressive force.

11. An electrical connector, comprising:

a terminal holder defining at least one terminal opening adapted to receive a terminal from a first side of the terminal holder in a terminal insertion direction; and a terminal positioning device arranged adjacent the first side of the terminal holder and defining:

a sliding surface abutting a portion of the connector; and at least one terminal contact surface, the terminal positioning device movable relative to the terminal holder in an operating direction perpendicular to the insertion direction between a first position wherein the device does not overlap the at least one terminal opening in the insertion direction, and a second position wherein the at least one terminal contact surface overlaps the at least one terminal opening in the insertion direction, the terminal contact surface includes a ramp surface oriented obliquely relative to the sliding surface and a planar section adjacent to the ramp surface, the ramp surface engages the terminal before the planar section as the terminal positioning device moves from the first position to the second position.

12. The electrical connector of claim 11, further comprising a connector body defining a cavity, the terminal holder arranged within the cavity and the terminal positioning device arranged between the first side of the terminal holder and an interior wall of the connector body, the sliding surface of the device abutting the interior wall.

13. The electrical connector of claim 11, wherein the planar section abuts the first side of the terminal holder.

14. The electrical connector of claim 13, wherein the terminal positioning device includes a plurality of terminal locks extending in a direction normal to the operating direction, the terminal locks each defining a terminal contact surface including the ramp surface and the planar section.

15. The electrical connector of claim 14, wherein the plurality of terminal locks are arranged in a row extending in the operating direction.

16. The electrical connector of claim 11, further comprising at least one terminal arranged within the at least one terminal opening of the terminal holder, wherein in the second position of the terminal positioning device, the at least one terminal contact surface abuts the at least one terminal in the insertion direction.

17. The electrical connector of claim 16, wherein a portion of the at least one terminal extends through the terminal positioning device in a direction opposite the insertion direction.

18. A method of installing a terminal into a terminal holder of an electrical connector, including the steps of:

inserting a terminal into an opening formed in a terminal holder in an insertion direction to a position that is less than a final position;

biasing a terminal positioning device in an operational direction perpendicular to the insertion direction;

as the terminal positioning device is biased in the operational direction, engaging a portion of the terminal with a ramp surface of the terminal positioning device extending both in the operational direction and the insertion direction;

biasing the terminal in the insertion direction with the terminal positioning device by continuing to bias the terminal positioning device in the operational direction.

19. The method of claim 18, further comprising the step of locking the terminal positioning device in position such that a portion of the terminal positioning device opposes the terminal in a direction opposite the insertion direction.

* * * * *